3,190,084
FLEXIBLE DRIVE SHAFT ASSEMBLY
Philip Roger Moon, Bushey, Walter Stanley Stockwell, Carpenders Park, and Richard George Tilbury, Letchmore Heath, England, assignors to S. Smith & Sons (England) Limited, London, England, a British company
Filed Feb. 26, 1963, Ser. No. 261,093
Claims priority, application Great Britain, Mar. 2, 1962, 8,119/62
5 Claims. (Cl. 64—3)

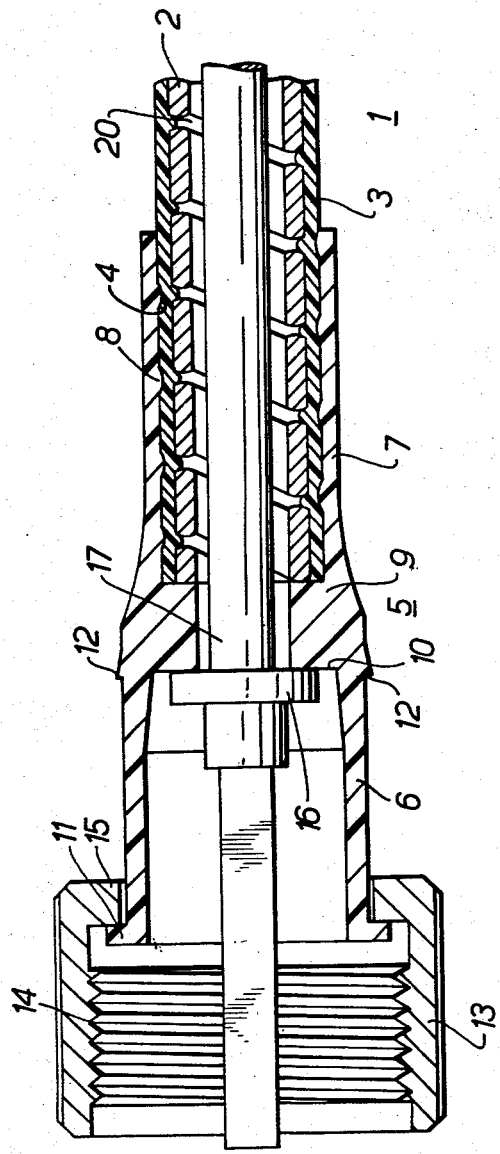

This invention relates to flexible driving shaft assemblies comprising an inner driving member which may rotate or move longitudinally, and a tubular outer member which in use is held against movement. The outer member is provided at one or both ends with coupling parts to enable it to be supported and held against movement.

According to this invention there is provided an outer member for a flexible driving shaft assembly of the kind referred to comprising an inner helically-wound reinforcing layer, an outer layer of a relatively resilient material, and a tubular coupling part at at least one end which overlaps the outer layer adjacent to the end, the said part being moulded or cast in position from a relatively rigid material so that it grips the outer layer tightly without necessarily being bonded to it.

Adjacent turns of the helically-wound inner layer are preferably spaced apart axially so that where the outer layer is overlapped by the coupling part the outer layer is deformed inwardly into the gaps between the turns of the inner layer thereby forming a key for the said part.

Preferably the said coupling part is formed internally, adjacent to the end of the outer member, with an annular bearing surface adapted to be engaged by a corresponding surface on a rotatable inner driving member.

Preferably the outer layer is formed of polyvinylchloride (P.V.C.).

Preferably the coupling part is moulded in position from the plastics material known as nylon.

A flexible driving shaft assembly having an outer member in accordance with this invention will now be described with reference to the accompanying drawing which is an axial cross sectional view of one end of the assembly with an associated coupling part.

The outer member, indicated at 1, comprises an inner layer 2 formed of high tensile steel wire flattened across a diameter and wound into a helix so that the flattened surfaces face towards and away from the axis of the helix. Adjacent turns of the helix are spaced apart as indicated at 20. Layer 2 is surrounded by an extruded layer 3 of the plastic material known as polyvinylchloride (P.V.C.). The coupling part, indicated generally at 5, is moulded from the material known as nylon. It is tubular in form and surrounds the end of the member 1 and also projects beyond it. The projecting portion 6 is of slightly greater diameter than the portion 7 which surrounds the outer member 1. The portion 7 is formed internally with a helical rib 8 which engages a helical depression 4 in the layer 3 opposite the space 20 between the turns of layer 2.

Immediately adjacent to the end of the member 1, the coupling part 5 carries an annular inward projection 9 which terminates flush with the interior surface of layer 2. The projection 9 is formed with an outwardly facing annular bearing surface 10. The outer end of portion 6 of coupling part 5 is formed externally with a flange 11. Portion 6 is also formed on its outer surface with a number of triangular shaped projections 12 which lie adjacent to a plane perpendicular to the axis of the coupling part. A further coupling part 13 is formed internally at 14 with a screw thread and at 15 with an internal flange. This flange surrounds portion 6 of coupling part 5 and engages flange 11 so as to retain part 13. Projections 12 are shaped so that flange 15 may be passed over them towards flange 11 but not in the opposite direction. These projections therefore act as retainers for part 13 once it is placed in position.

Part 5 is moulded in position at the end of member 1. A split mould (not shown) having an internal spigot is employed for this purpose. The split parts have an internal contour which corresponds to the outer contour of part 5, and the spigot provides the internal contour of portion 6 and also projects to some extent into the interior of member 1. The end of member 1 is placed in position in the mould, and nylon in a suitable form for moulding and at a suitable temperature is forced into the interior cavity. The temperature and pressure cause the helical depression 4 to be formed in layer 3. Upon cooling, part 5 shrinks slightly and grips layer 3 (which is of a resilient nature) tightly. It will be appreciated that the depression 4 and rib 8 constitute a key for part 5. The moulding conditions must be controlled so as to ensure that the layer 3 is not damaged during the moulding.

In use, a flange indicated at 16 adjacent to the end of the inner rotatable driving member 17 engages the annular bearing surface 10 so as to locate the inner member axially. The coupling part 5 is secured by means of the rotatable further part 13 to a corresponding fixed part of apparatus with which a driving connection must be established.

What is claimed is:
1. A flexible driving shaft assembly comprising an inner driving member, a tubular outer member disposed in surrounding relation to said driving member, said outer member comprising an inner tubular layer of helically wound wire, adjacent turns of said wire being spaced apart axially to form a helical gap, said outer member also comprising an outer layer fabricated of a plastic material and having portions of its inner surface protruding between the turns of said wire, and a tubular coupling part surrounding and overlapping at least a portion of said plastic outer layer, said coupling part having a helical protrusion on its inner surface, the spacing between the turns of said helical protrusion being substantially the same as said helical gap, said coupling part being press fitted onto said outer layer with said helical protrusion forming a key between said coupling part and said outer layer.

2. A flexible driving shaft assembly as claimed in claim 1 wherein said outer layer is formed of polyvinylchloride.

3. A flexible driving shaft assembly as claimed in claim 1 wherein said coupling part is moulded from nylon.

4. The assembly of claim 1 wherein said coupling part is formed of a moulded plastic material having the characteristic of contracting when cooled from the temperature at which it is moulded, said moulded coupling being press fitted onto the outer surface of said outer layer due to said contraction.

5. The assembly of claim 1 wherein said coupling part is a moulded plastic member.

References Cited by the Examiner

UNITED STATES PATENTS

| | | | |
|---|---|---|---|
| 1,943,980 | 1/34 | Mall | 64—4 |
| 2,706,494 | 4/55 | Morse | 138—131 |
| 2,884,771 | 5/59 | Holt | 64—4 |
| 2,918,808 | 12/59 | Botti | 64—4 |

FOREIGN PATENTS 609,559  11/60  Canada.

ROBERT C. RIORDON, *Primary Examiner.*